July 3, 1962

R. C. HASELTINE 3,041,719

METHOD OF MAKING A COMPOSITE TUBE

Filed May 5, 1959

INVENTOR.
ROBERT C. HASELTINE

BY Karl Haber
James E. Bryan
Alan C. Rose
ATTORNEYS

United States Patent Office 3,041,719
Patented July 3, 1962

3,041,719
METHOD OF MAKING A COMPOSITE TUBE
Robert C. Haseltine, Plainville, Mass., assignor, by mesne assignments, to Engelhard Industries, Inc., Newark, N.J., a corporation of Delaware
Filed May 5, 1959, Ser. No. 811,048
7 Claims. (Cl. 29—517)

The present invention deals with the method of making a composite tube and more particularly with the method of making a composite tube of polygonal and rectangular cross-section.

The invention concerns the method of making a composite tube composed of a plurality of inner polygonal tubes, e.g. rectangular tubes, within a polygonal, e.g. rectangular, outer tube, whereby the tubes are preformed, for example, into rectangular rounded corner tubes prior to assembly and then drawn over a plurality of plugs positioned in the inner tubes and simultaneously passed through a reducing means such as a turkshead to provide the combined tubes with a substantially sharply defined rectangular cross-section. The method assures the manufacturing of the composite tube within extremely low tolerances, e.g. within about plus or minus 0.002 inch, since the preformed tubes are first formed with the finished thickness of the composite tube components and the inner diameter is within the range of 0.010 inch to 0.020 inch larger than the inner tubes of the finished composite tube components.

Figure 1:
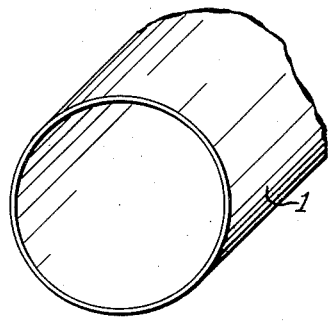
Figure 2:
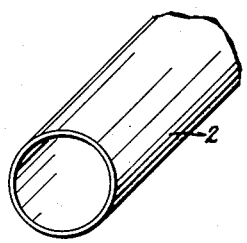
Figure 3:
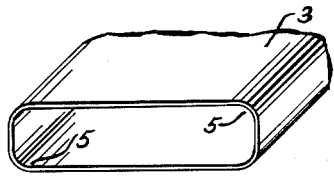
Figure 4:
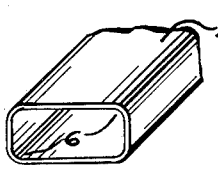
Figure 5:
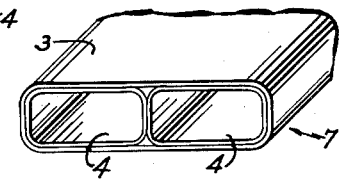
Figure 6:
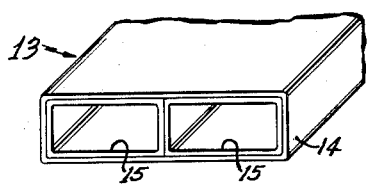
Figure 8:
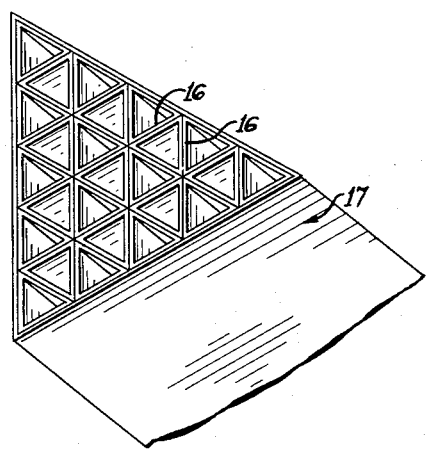
Figure 7:
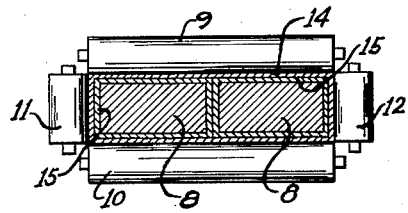

It is an object of the invention to provide a composite tube of a plurality of metal inner tubes of polygonal or rectangular cross-section positioned in a larger metal tube of polygonal or rectangular cross-section and especially useful as a plural waveguide tube or as a plural conduit assembly. Other objects and advantages of the invention will become apparent from the description hereinafter following and drawing forming a part hereof in which:

FIGURE 1 is an isometric view of a preformed outer tube according to the invention, FIGURE 2 is an isometric view of a preformed inner tube according to the invention, FIGURE 3 is an isometric view of an intermediate form of the outer tube, FIGURE 4 is an isometric view of the intermediate form of the inner tube, FIGURE 5 is an isometric view of the assembled intermediate form of the composite tube, FIGURE 6 is an isometric view of the finished composite tube, FIGURE 7 is an end view of an apparatus for finishing the composite tube, and FIGURE 8 is a fragmentary isometric view of a modified form of composite tube.

Regarding FIGURES 1 and 2 the outer tube 1 and inner tube 2 are provided in the form of preformed cylindrical tubes having the thickness of the finished composite tube components. The outer surface of the inner tube 2 or the inner surface of the outer tube 1, or both such surfaces, may be advantageously solder-flushed with a suitable solder for subsequent bonding. Having provided a plurality of inner tubes 2, such inner tubes and the outer tube are formed, e.g. by rolling into intermediate rectangular forms 3 and 4 each having four rounded corners 5 and 6, as illustrated by FIGURES 3 and 4.

The intermediate forms of the tubes according to FIGURES 3 and 4 are assembled according to FIGURE 5 with the inner rectangular tubes 4 positioned in the larger rectangular tube 3 to provide an intermediate composite tube 7 with or without the above-mentioned solder-flushing.

The intermediate composite tube 7 is then drawn over a plurality of rectangular plugs 8 positioned in tubes 4 and simultaneously passed through a reducing means such as a turkshead composed of rolls 9, 10, 11 and 12 outlining a rectangular passage, as illustrated by FIGURE 7, whereby the composite tube 7 is compressed or reduced, and the components are formed into a substantially sharply defined rectangular composite tube 13 composed of a rectangular outer tube component 14 and rectangular inner tube components 15 as illustrated by FIGURE 6.

More specifically, the composite tube is manufactured according to the following examples:

*Example I*

An outer cylindrical copper tube was drawn with an inner diameter of 1.650 inches and a wall thickness of 0.025 inch.

Two inner cylindrical silver tubes were drawn with each tube having an inner diameter of 0.750 inch and a wall thickness of 0.025 inch.

The three tubes were each drawn over a plug through a turkshead shaping device into a rounded corner rectangular cross-section. The outer rectangular tube had a width of 1.930 inches, a height of 0.470 inch and a wall thickness of 0.025 inch. Each inner rectangular tube had a width of 0.910 inch, a height of 0.410 inch and a thickness of 0.025 inch.

The inner rectangular tubes were inserted side by side into the larger rectangular tube and passed over plugs in each inner tube through a turkshead and shaped to a finished sharply defined rectangular cross-section. The overall dimensions of the composite tube were 1.950 inches in width and 0.500 inch in height. Each inner tube had inner dimensions of 0.900 inch in width and 0.400 inch in height.

*Example II*

The composite rectangular tube was formed as described in Example I except that the outer surface of the cylindrical inner tubes were solder-flushed prior to shaping.

While the examples refer to a rectangular copper outer tube and silver rectangular inner tubes, the composite tube may be formed of other dissimilar metals with the inner tubes being composed of electrically conductive metal.

FIGURE 8 illustrates a modification of the invention whereby the inner tubes 16 are in the form of a triangular cross-section and the outer tube 17 is in the form of a triangular cross-section. The term "polygonal cross-section" hereinabove referred to is intended to include the triangular cross-section tubes as well as the rectangular cross-section tubes, and the composite tube formed therefrom is made by the same methods employed in the manufacture of the rectangular composite tube with the plugs having polygonal cross-sections and the turkshead having a polygonal passage.

Various modifications are contemplated within the scope of the appended claims.

What is claimed is:

1. The method of making a plural duct composite tube of polygonal cross-section comprising forming an outer cylindrical metal tube and a plurality of inner cylindrical metal tubes, the inner tubes each having an overall diameter not greater than one-half the inner diameter of the outer tube, forming said outer tube to a polygonal cross-section and forming each of the inner tubes to a complementary polygonal cross-section to that of the outer tube with the corners thereof being rounded, inserting said inner tubes into said outer tube until said outer tube is filled with said inner tubes, drawing the assembled tubes simultaneously over plugs of polygonal cross-section complementary to the polygonal cross-section of the outer tube and positioned in the inner tubes and through polygonal cross-section forming reducing means and shaping the tubes into substantially sharply defined polygonal cross-sections, whereby the outer tube is plastically deformed inwardly by the drawing operation to secure same to the inner tubes.

2. The method according to claim 1, wherein the plugs are of rectangular cross-section.

3. The method according to claim 1, wherein the plugs are of triangular cross-section.

4. The method according to claim 1, wherein the inner tubes are composed of a metal dissimilar to that of the outer tube.

5. The method according to claim 1, wherein the inner tubes are composed of an electrical conductive metal.

6. The method according to claim 1, comprising solder-flushing the inner surface of the outer cylindrical group.

7. The method according to claim 1, comprising solder-flushing the outer surfaces of the inner cylindrical tubes.

References Cited in the file of this patent

UNITED STATES PATENTS

| | | |
|---|---|---|
| 1,141,067 | Lloyd | May 25, 1915 |
| 2,499,977 | Scott | Mar. 7, 1950 |
| 2,619,438 | Varian et al. | Nov. 25, 1952 |
| 2,722,733 | Meyer | Nov. 8, 1955 |
| 2,851,770 | Fromson | Sept. 16, 1958 |